United States Patent
Nodera

(10) Patent No.: US 7,217,757 B2
(45) Date of Patent: May 15, 2007

(54) THERMOPLASTIC RESIN AND FORMED PRODUCT

(75) Inventor: Akio Nodera, Chiba (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 0 days.

(21) Appl. No.: 10/518,538

(22) PCT Filed: Jun. 16, 2003

(86) PCT No.: PCT/JP03/07612

§ 371 (c)(1),
(2), (4) Date: Dec. 30, 2004

(87) PCT Pub. No.: WO2004/003079

PCT Pub. Date: Jan. 8, 2004

(65) Prior Publication Data

US 2005/0209398 A1    Sep. 22, 2005

(30) Foreign Application Priority Data

Jul. 1, 2002  (JP) .............................. 2002-192443

(51) Int. Cl.
*C08K 5/36* (2006.01)

(52) U.S. Cl. ...................................... 524/492

(58) Field of Classification Search ................. 524/492
See application file for complete search history.

(56) References Cited

U.S. PATENT DOCUMENTS 6,001,929 A * 12/1999 Nodera et al. ............ 525/92 E
6,664,313 B2 * 12/2003 Hirai et al. ................. 523/209
6,727,312 B1 * 4/2004 Nodera ....................... 524/451

FOREIGN PATENT DOCUMENTS

EP    0 692 522    1/1996

* cited by examiner

*Primary Examiner*—Kriellion Sanders
(74) *Attorney, Agent, or Firm*—Oblon, Spivak, McClelland, Maier & Neustadt, P.C.

(57) ABSTRACT

To provide a thermoplastic resin composition capable of affording a molded article which has excellent flame retardancy and compressive strength, which has good dimensional accuracy and which has good appearance. A thermoplastic resin composition including (A) 0.5 to 99.9 mass % of an aromatic polycarbonate-polyorganosiloxane copolymer terminated with an aromatic compound, (B) 0 to 99.5 mass % of an aromatic polycarbonate terminated with an aromatic compound, (C) 0.1 to 5 mass % of fine silica, and (D) 0 to 2 mass % of a polytetrafluoroethylene resin, and a molded article thereof, which are compounded together.

13 Claims, No Drawings

THERMOPLASTIC RESIN AND FORMED PRODUCT

CROSS REFERENCES TO RELATED APPLICATIONS

This application is a national stage application of International Patent Application No. PCT/JP03/07612, filed on Jun. 16, 2003, and claims priority to Japanese Patent Application No. 2002-192443, filed on Jul. 1, 2002, both of which are incorporated herein by reference in their entireties.

TECHNICAL FIELD

The present invention relates to a thermoplastic resin composition and to a molded article thereof. More specifically, the present invention is directed to a thermoplastic resin composition having excellent flame retardancy and impact strength and giving molded articles with good appearance and to a molded article thereof.

BACKGROUND ART

Thermoplastic reins, particularly polycarbonate resins, are widely utilized as engineering plastics in various fields such as in the fields of OA appliances and electric and electronic appliances and in the field of automobiles, because of their excellent mechanical strengths (particularly impact resistance properties), electric properties and transparency. In these utilization fields, there are some fields that require flame retardancy. The center of such utilization fields is the field of OA appliances and electric and electronic appliances. Among various thermoplastic resins a polycarbonate resin is one of the resins having a high oxygen index and is generally said to be a self-extinguishable resin. The level of flame retardancy required in the field of OA appliances and electric and electronic appliances is, however, generally as high as a V-0 level in terms of UL94 standard pertaining to flame retardancy. Thus, in order to impart a flame retardancy that meets with such a level to the composition, it is a general practice to add a flame retardant or a flame retarding aid thereto.

On the other hand, a polycarbonate-polyorganosiloxane copolymer or a mixture of a polycarbonate-polyorganosiloxane copolymer with a polycarbonate resin is generally known to exhibit a higher flame retardancy as compared with a polycarbonate resin. Since the flame retardancy attained by using a polycarbonate-polyorganosiloxane copolymer by itself is still insufficient to satisfy the above flame retardancy level, compositions in which various flame retardants are cojointly used are disclosed (for example, Japanese Patent Application Laid-Open No. Sho 63-S-63-289059, Japanese Patent Application Laid-Open No. Hei 1-210462, Japanese Patent Application Laid-Open No. Hei 3-200862 and Japanese Patent Application Laid-Open No. Hei 4-202465). In the techniques disclosed in these publications, however, there is a drawback that a melt of the polycarbonate-based resin drops when the resin is highly fluidized during combustion. Also, a system in which a flame retardant, particularly a halogen-containing flame retardant such as a bromine compound, generally poses a problem that the thermal stability is poor.

As described previously, polycarbonate resins are widely used as OA appliances, electric and electronic appliances and automobile parts, because of their excellent mechanical strengths (particularly impact resistance properties), electric properties and transparency. It is necessary for the materials for such precision parts to give moldings having good surface smoothness and dimensional stability. Further, the moldings obtained are required to have a good appearance.

In this circumstance, the present inventors have proposed a resin composition which comprises a polycarbonate-polyorganosiloxane copolymer blended with a polytetrafluoroethylene and which has improved thermal stability and melt dropping property and yet shows high flame retardancy (Japanese Patent No. 3037588). However, still further improvement of the flame retardancy is desired.

Japanese Patent Application Laid-Open No. Hei 5-214234 discloses a resin composition including a polycarbonate-polyorganosiloxane copolymer blended with a polytetrafluoroethylene and fumed silica. Fumed silica, which has a network structure, however, is not able to be sufficiently dispersed in the resin. Therefore, in order to obtain a high impact strength, it is necessary to increase the content of the siloxane. As a consequence, it is not possible to obtain moldings having a satisfactory appearance. Japanese Patent Application Laid-Open No. Hei 6-172628, Japanese Patent Application Laid-Open No. Hei Japanese Patent Application Laid-Open No. Hei 7-33971 and Japanese Patent Application Laid-Open No. Hei 9-310011 disclose techniques in which silica is added to various resins including a polycarbonate. In these techniques, granular or powdery silica having specific shapes are added for the purpose of improving mold processability, drop-preventing property during combustion and blow-moldability as well as flame retardancy. With such methods, the silica is not able to be sufficiently dispersed in the resin and, therefore, it is impossible to produce moldings having satisfactory flame retardancy, impact strength and appearance.

DISCLOSURE OF THE INVENTION

It is an object of the present invention to provide a thermoplastic resin composition which exhibits a sufficient flame retardancy, particularly sufficient flame retardancy without using a halogen-containing flame retardant, excellent impact strength and affording molded articles having a good appearance and to provide a molded article thereof.

The present inventors have made an earnest study to accomplish the above object and, as a result, have found that it is possible to obtain a resin composition which has excellent flame retardancy and impact strength and which affords molded articles having a good appearance by compounding specific fine silica and, if necessary, an aromatic polycarbonate and polytetrafluoroethylene with an aromatic polycarbonate-polyorganosiloxane copolymer. The present invention has been completed based on this finding.

Namely, the gist of the present invention is as follows:

(I) A thermoplastic resin composition comprising:

(A) 0.5 to 99.9 mass % of an aromatic polycarbonate-polyorganosiloxane copolymer having a terminal group represented by the following general formula (1):

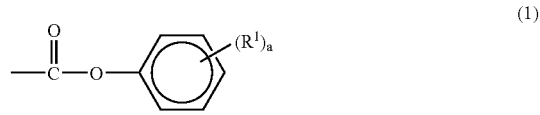

wherein $R^1$ represents an alkyl group having 1 to 35 carbon atoms and a is an integer of 0 to 5;

(B) 0 to 99.5 mass % of an aromatic polycarbonate having a terminal group represented by the following general formula (2):

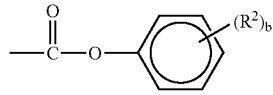

(2)

wherein $R^2$ represents an alkyl group having 1 to 35 carbon atoms and b is an integer of 0 to 5;

(C) 0.1 to 5 mass % of fine silica; and (D) 0 to 2 mass % of a polytetrafluoroethylene, which are compounded together.

(II) A thermoplastic resin composition as defined in (I) above, wherein the aromatic polycarbonate-polyorganosiloxane copolymer of component (A) has a polyorganosiloxane moiety having a polydimethylsiloxane skeleton.

(III) A thermoplastic resin composition as defined in (I) or (II) above, wherein the aromatic polycarbonate-polyorganosiloxane copolymer of component (A) contains a polyorganosiloxane moiety in an amount of 0.1 to 4 mass % based on the whole thermoplastic resin composition.

(IV) A thermoplastic resin composition as defined in any one of (I) through (III) above, wherein the fine silica of component (C) has an average particle diameter of 50 nm or less.

(V) A thermoplastic resin composition as defined in any one of (I) through (IV) above, wherein the fine silica of component (C) is dispersed in a solvent.

(VI) A molded article comprising a thermoplastic resin composition as defined in any one of (I) through (V) above.

BEST MODE FOR CARRYING OUT THE INVENTION

The present invention is described in detail below.

As the aromatic polycarbonate-polyorganosiloxane copolymer represented by the above general formula (1), which is component (A) of the thermoplastic resin composition of the present invention, there may be mentioned copolymers disclosed in, for example, Japanese Patent Application Laid-Open No. Sho50-29695, Japanese Patent Application Laid-Open No. Hei 3-292359, Japanese Patent Application Laid-Open No. Hei 4-202465, Japanese Patent Application Laid-Open No. Hei 8-81620, Japanese Patent Application Laid-Open No. Hei 8-302178 and Japanese Patent Application Laid-Open No. Hei 10-7897. In the formula the symbol $R^1$ represents an alkyl group which has 1 to 35 carbon atoms, which may be linear or branched and which may be linked at a p-position, m-position or o-position, preferably p-position. The alkyl group $R^1$ positioning at the molecular terminus is more preferably an alkyl group having 10 to 35 carbon atoms.

The aromatic polycarbonate-polyorganosiloxane copolymer is preferably a copolymer having, in the molecule thereof, an aromatic polycarbonate moiety including a structural unit represented by the general formula (3) shown below and a polyorganosiloxane moiety including a structural unit represented by the general formula (4) shown below:

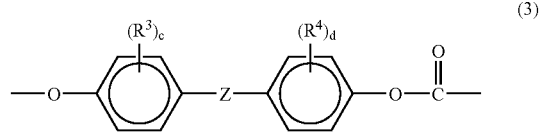

(3)

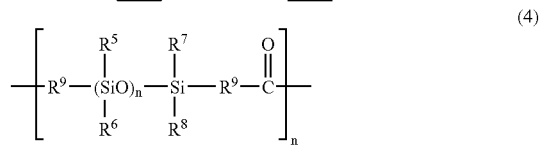

(4)

In the formulas, $R^3$ and $R^4$ each represent an alkyl group having 1 to 6 carbon atoms or a phenyl group and may be the same or different, $R^5$ to $R^8$ each represent an alkyl group having 1 to 6 carbon atoms or a phenyl group, preferably a methyl group, and may be the same or different, and $R^9$ represents an organic residue containing an aliphatic or aromatic group, preferably an o-allylphenol residue, a p-hydroxystyrene residue or an eugenol residue.

The symbol Z represents a single bond, an alkylene group having 1 to 20 carbon atoms, an alkylidene group having 1 to 20 carbon atoms, a cycloalkylene group having 5 to 20 carbon atoms, a cycloalkylidene group having 5 to 20 carbon atoms, or a —$SO_2$—, —SO—, —S—, —O— or —CO— linkage. Preferably, Z is an isopropylidene group. The symbols c and d each represent an integer of 0 to 4, preferably 0, and n is an integer of 1 to 500, preferably 5 to 200.

The aromatic polycarbonate-polyorganosiloxane copolymer may be produced by, for example, dissolving a previously prepared aromatic polycarbonate oligomer (hereinafter referred to as "PC oligomer"), which will constitute the aromatic polycarbonate moiety, and a polyorganosiloxane (reactive PORS), which will constitute the polyorganosiloxane moiety and which has a reactive group, such as an o-allylphenol group, a p-hydroxystyrene group or an eugenol residue, at a terminus thereof, in a solvent such as methylene chloride, chlorobenzene or chloroform, the resulting solution being, after having been added with an aqueous caustic alkali solution of a dihydric phenol, subjected to interfacial polycondensation using as a catalyst a tertiary amine (triethylamine, etc.) or a quaternary ammonium salt (trimethylbenzylammonium chloride, etc.) in the presence of an ordinary terminating agent including a phenol compound represented by the following general formula (5):

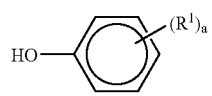

(5)

wherein $R^1$ and a have the same meaning as that in the general formula (1).

As the above terminating agent, there may be specifically mentioned, for example, phenol, p-cresol, p-tert-butylphenol, p-tert-octylphenol, p-cumylphenol, p-nonylphenol, p-tert-amylphenol, bromophenol, tribromophenol and pentabromophenol. Above all, halogen-free compounds are preferable from the standpoint of environmental problems.

The PC oligomer used for the preparation of the aromatic polycarbonate-polyorganosiloxane copolymer may be easily produced by reacting a dihydric phenol represented by the following general formula (6):

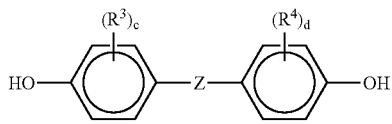

(6)

wherein $R^3$, $R^4$ and Z, c and d have the same meaning as that in the general formula (3), with a carbonate precursor, such as phosgene or a carbonic ester compound, in a solvent, such as methylene chloride.

Namely, the oligomer may be produced, for example, by reaction of a dihydric phenol with a carbonate precursor such as phosgene or by ester exchange reaction of a carbonate precursor such as diphenyl carbonate with a dihydric phenol in a solvent such as methylene chloride.

As the dihydric phenol represented by the general formula (6), there may be mentioned 4,4'-dihydroxydiphenyl; bis(4-hydroxyphenyl)alkanes such as 1,1-bis(4-hydroxyphenyl) methane, 1,1-bis(4-hydroxyphenyl)ethane and 2,2-bis(4-hydroxyphenyl)propane; bis(4-hydroxyphenyl)cycloalkanes; bis(4-hydroxyphenyl)oxide; bis(4-hydroxyphenyl)sulfide; bis(4-hydroxyphenyl)sulfone; bis(4-hydroxyphenyl)sulfoxide; bis(4-hydroxyphenyl)ether; and bis(4-hydroxyphenyl) ketone. Above all, 2,2-bis(4-hydroxyphenyl)propane [bisphenol A] is preferable. These dihydric phenols may be used singly or may be used in combination of two or more.

As the carbonic ester compound, there may be mentioned diaryl carbonates such as diphenyl carbonate, and dialkyl carbonates such as dimethyl carbonate and diethyl carbonate.

The PC oligomer used for the preparation of the aromatic polycarbonate-polyorganosiloxane copolymer may be a homopolymer using one of the above-described dihydric phenols or a copolymer using two or more thereof.

Further, the oligomer may be a thermoplastic random branched polycarbonate obtainable by using the above dihydric phenol together with a polyfunctional aromatic compound.

In such a case, as the polyfunctional aromatic compound serving as a branching agent, there may be used 1,1,1-tris (4-hydroxyphenyl)ethane, α,α',α"-tris(4-hydroxyphenyl)-1,3,5-triisopropylbenzene, 1-[α-methyl-α-(4'-hydroxyphenyl) ethyl]-4-[α',α'-bis(4"-hydroxyphenyl)ethyl]benzene, phloroglucin, trimellitic acid or isatin-bis(o-cresol).

The aromatic polycarbonate-polyorganosiloxane copolymer of component (A), can be prepared in the manner as described above. In this case, since an aromatic polycarbonate is generally byproduced, the product obtained is an aromatic polycarbonate resin containing the aromatic polycarbonate-polyorganosiloxane copolymer. Such an aromatic polycarbonate resin as a whole preferably has a viscosity-average molecular weight of 10,000 to 40,000, more preferably 12,000 to 30,000.

The content of the polyorganosiloxane in the aromatic polycarbonate-polyorganosiloxane copolymer of component (A) is 0.1 to 4 mass %, preferably 0.3 to 2 mass %, based on the whole thermoplastic resin composition including component (A). Too low a proportion of the polyorganosiloxane in the thermoplastic resin composition less than 0.1 mass % is insufficient to provide satisfactory flame retardancy and impact resistance. Too high an amount of the polyorganosiloxane in excess of 4 mass %, on the other hand, causes a reduction of the heat resistance and flame retardancy. The particularly preferred polyorganosiloxane is polydimethylsiloxane (PDMS).

The copolymer obtainable by the above method substantially has the terminal group represented by the above general formula (1) at one or both ends of the copolymer molecule.

In the thermoplastic resin composition according to the present invention, the content of the aromatic polycarbonate-polyorganosiloxane copolymer, which has the terminal group represented by the general formula (1) and which is component (A), is 0.5 to 99.9 mass %, preferably 5 to 95 mass %, based on the resin composition.

When the content is less than 0.5 mass %, satisfactory flame retardancy is not obtainable. When the content exceeds 99.9 mass %, the heat resistance and rigidity are so low that the composition capable of exhibiting satisfactory performance cannot be obtained. Further, when the copolymer is compounded with the aromatic polycarbonate resin having the terminal group represented by the general formula (2), the compatibility therebetween is not good.

The aromatic polycarbonate resin, which has the terminal group represented by the general formula (2) and which is component (B) of the thermoplastic resin composition of the present invention, preferably has a viscosity-average molecular weight of 10,000 to 40,000, more preferably 12,000 to 30,000. In the general formula (2), $R^2$ represents an alkyl group which has 1 to 35 carbon atoms, preferably 10 to 35 carbon atoms, which may be linear or branched and which may be located at a p-position, m-position or o-position, preferably p-position.

The aromatic polycarbonate resin having the terminal group represented by the general formula (2) may be easily produced by reacting a dihydric phenol with phosgene or a carbonic ester compound.

Namely, the aromatic polycarbonate resin may be produced, for example, by reaction of a dihydric phenol with a carbonate precursor such as phosgene or by ester exchange reaction of a carbonate precursor such as diphenyl carbonate with a dihydric phenol in a solvent such as methylene chloride in the presence of a catalyst, such as triethylamine, and a specific terminating agent.

The dihydric phenol herein may be the same compound as that represented by the above general formula (6) or may be different therefrom. Also usable may be a homopolymer formed by using a single kind of the above-described dihydric phenol or a copolymer formed by using two or more such dihydric phenols. Further, a thermoplastic random branched polycarbonate obtained by using the above-described dihydric phenol together with a polyfunctional aromatic compound may be used.

As the carbonic ester compound, there may be mentioned diaryl carbonates such as diphenyl carbonate and dialkyl carbonates such as dimethyl carbonate and diethyl carbonate.

As the terminating agent, a phenol compound capable of forming the terminal group represented by the general formula (2) may be used. Namely, the terminating agent is a phenol compound represented by the following general formula (7):

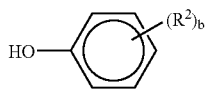

(7)

wherein R² have the same meaning as that in the above general formula (2).

As the alkylphenols, there may be mentioned phenol, p-cresol, p-tert-butylphenol, p-tert-octylphenol, p-cumylphenol, p-nonylphenol, docosylphenol, tetracosylphenol, hexacosylphenol, octacosylphenol, triacontylphenol, dotriacontylphenol and tetratriacontylphenol. These may be used singly or as a mixture of two or more.

These alkylphenols may be used together with other phenol compounds as long as the effects are not adversely affected.

The aromatic polycarbonate obtainable by the above method substantially has the terminal group represented by the general formula (2) at one or both ends of the copolymer molecule.

In the thermoplastic resin composition according to the present invention, the content of the aromatic polycarbonate, which has the terminal group represented by the general formula (2) and which is component (B), is 0 to 99.5 mass %, more preferably 0 to 95 mass %. When the content is 99.5 mass % or less, sufficient flame retardancy is obtainable.

It is further preferred that the molecular terminus or termini of the aromatic polycarbonate of component (B) be an alkyl group having 10 to 35 carbon atoms for reasons of high fluidity. An alkyl group of the molecular terminus having 10 or more carbon atoms can improve the fluidity of the thermoplastic resin composition. When the molecular terminus is an alkyl group having 36 or more carbon atoms, however, the heat resistance and impact resistance are reduced.

In the thermoplastic resin composition according to the present invention, the heat resistance and impact resistance increase because such an aromatic polycarbonate resin is contained therein.

Fine silica of component (C) is used and compounded in the thermoplastic resin composition of the present invention. The fine silica used in the present invention is high purity anhydrous silica which has preferably $SiO_2 > 99.5\%$, an average particle diameter of 50 nm or less, preferably 5 to 40 nm, and a specific surface area of 50 to 400 m²/g, preferably 60 to 350 m²/g. Such silica may be easily commercially available as AEROSIL or COLLOIDAL SILICA. However, fine silica is not specifically limited as long as it has the above-described features. The fine silica is added in an amount of 0.1 to 5 mass %, preferably 0.1 to 3 mass %, based on the thermoplastic resin composition. When the amount of the fine silica exceeds 5 mass %, sufficient flame retardancy is unable to be obtained. Additionally, the impact resistance is lowered and the appearance becomes no good. When the amount of the fine silica is below 0.1 mass %, on the other hand, it is impossible to obtain good drop-preventing effect.

So that the fine silica can be finely dispersed in the resin, a dispersion of the silica in a solvent, etc. may be used in the resin composition of the present invention. As the solvent, water, ethylene glycol or the like solvent may be preferably used. A dispersion having a silica content of 5 to 50 mass % is used.

If necessary, polytetrafluoroethylene (hereinafter referred to as PTFE for brevity), which is component (D), may be incorporated in the thermoplastic resin composition of the present invention. The PTFE serves to impart melt drop-preventing effect to the resin. A high flame retardancy can be imparted, when PTFE capable of forming fibrils is used. The average molecular weight of the PTFE should be at least 500,000, preferably 500,000 to 10,000,000, more preferably 1,000,000 to 10,000,000.

As PTFE capable of forming fibrils of component (D) of the thermoplastic resin composition of the present invention, there may be used, for example, those classified in Type 3 according to ASTM Standard, although not specifically limited thereto. Specific examples of the PTFE classified in Type 3 include TEFLON 6-J (Trade Name; manufactured by DuPont Mitsui Fluorochemicals) and POLYFLON D-1 and POLYFLON F-103 (both Trade Names; manufactured by Daikin Industries, Ltd.). As PTFE other than those of Type 3, there may be mentioned ARGOFLON F5 (Trade Names; manufactured by Montefluos S.P.A.) and POLYFLON MPA FA-100 (Trade Name; manufactured by Daikin Industries, Ltd.). These PTFE may be used in combination of two or more. The above-described PTFE capable of forming fibrils may be obtained by, for example, polymerizing tetrafluoroethylene in an aqueous medium in the presence of sodium, potassium or ammonium peroxydisulfide under a pressure of 7 to 700 kPa at a temperature of 0 to 200° C., preferably between 20 to 100° C.

The PTFE of component (D) is added, if necessary, for the purpose of further improving flame retardancy of the thermoplastic resin composition and is used in an amount of 0 to 2 mass %, preferably 0 to 1 mass %, more preferably 0.1 to 1 mass %, based on the whole thermoplastic resin composition.

In addition to the above components (A), (B), (C) and (D), various kinds of inorganic fillers, additives or other synthetic resins, elastomers, etc. may be further incorporated into the thermoplastic resin composition of the present invention, if desired, to the extent that the objects of the present invention are not adversely affected. First, as the inorganic filler incorporated for the purpose of improving the mechanical strengths and durability of the thermoplastic resin composition or extending same, there may be mentioned glass fibers (GF), carbon fibers, glass beads, glass flakes, carbon black, calcium sulfate, calcium carbonate, calcium silicate, titanium oxide and alumina. As the additives, there may be mentioned, for example, antioxidants such as those of a hindered phenol-type, a phosphorus-type (phosphorous esters, phosphoric esters, etc.) and an amine-type; UV absorbing agents such as those of a benzotriazole-type and a benzophenone-type; external lubricants such as those of an aliphatic carboxylic ester-type and a paraffin-type, a silicone oil and a polyethylene wax; releasing agents; antistatic agents; and coloring agents. As other synthetic resins, there may be mentioned a polyethylene resin, a polypropylene resin, a polystyrene resin, an AS resin (acrylonitrile-styrene copolymer), an ABS resin (acrylonitrile-butadiene-styrene copolymer) and a poly(methyl methacrylate) resin. As the elastomers, there may be mentioned an isobutylene-isoprene rubber, a styrene-butadiene rubber, an ethylene-propylene rubber and an acrylic elastomer.

The thermoplastic resin composition of the present invention may be obtained by blending components (A), (C) and, if necessary, (B), (D) and, further other components if necessary, and kneading the resulting blend. The blending and kneading may be carried out in a customarily employed manner, for example, by using a ribbon blender, a Henschel mixer, a Banbury mixer, a drum tumbler, a single-screw extruder, a double-screw extruder, a cokneader, a multi-screw extruder, etc. The temperature at which the blend is heated for kneading is generally selected from the range of 240 to 320° C.

Using the thus obtained thermoplastic resin composition of the present invention, various molded articles such as chassis of OA appliances and housings in electric and electronic fields may be produced by various conventionally known molding methods such as injection molding, blow molding, extrusion molding, compression molding, calendar molding and rotary molding. The molded articles produced using the thermoplastic resin composition of the present invention are excellent in surface conditions and have very good dimensional accuracy. It is, therefore, possible to obtain molded articles having high accuracy and good surface conditions.

EXAMPLES

The present invention will be described more concretely below with reference to Examples. However, the present invention is not restricted to these Examples in any way.

Preparation Example 1

Production of Aromatic Polycarbonate (PC)-Polyorganosiloxane (PDMS) Copolymer (1) Production of PC Oligomer In 400 liters of a 5 mass % aqueous sodium hydroxide solution were dissolved 60 kg of bisphenol A to obtain an aqueous sodium hydroxide solution of bisphenol A. Then, the aqueous sodium hydroxide solution of bisphenol A maintained at room temperature and methylene chloride were introduced through an orifice plate at flow rates of 138 liter/hour and 69 liter/hour, respectively, into a tubular reactor having an inside diameter of 10 mm and a tube length of 10 m, into which phosgene was co-currently blown at a flow rate of 10.7 kg/hour so that the reaction was continuously carried out for 3 hours. The tubular reactor used herein was a double-walled tube, and cooling water was passed through a jacket part so that the temperature of the reaction liquid discharged therefrom was maintained at 25° C. The pH of the discharged liquid was adjusted to 10 to 11.

The thus obtained reaction liquid was allowed to leave at rest. An aqueous phase was separated and removed to collect a methylene chloride phase (220 liters) and to obtain PC oligomer (concentration: 317 g/liter). The thus obtained PC oligomer was found to have a degree of polymerization ranging from 2 to 4 and a concentration of chloroformate groups of 0.7 N.

(2) Production of Terminus-Modified Polycarbonate

In a vessel having an inside volume of 50 liters and equipped with a stirrer, 10 liters of PC oligomer obtained in (1) above were placed, in which 162 g of p-dodecylphenol (containing branched dodecyl groups; manufactured by Yuka Schenectady Inc.) were dissolved. To the solution was added an aqueous sodium hydroxide solution (sodium hydroxide: 53 g; water: 1 liter) and 5.8 milliliters of triethylamine, and the mixture was reacted for 1 hour with stirring at 300 rpm. Then, an aqueous sodium hydroxide solution of bisphenol A (bisphenol A: 720 g, NaOH: 412 g, water: 5.5 liters) and 8 liters of methylene chloride were added to the above system and the mixture was reacted for 1 hour with stirring at 500 rpm. After completion of the reaction, 7 liters of methylene chloride and 5 liters of water were added to the reaction mixture and stirred at 500 rpm for 10 minutes. Thereafter, the mixture was allowed to leave at rest and separated into an organic phase and an aqueous phase. The organic phase thus obtained was washed successively with 5 liters of an alkali (0.03 N NaOH), 5 liters of an acid (0.2 N hydrochloric acid) and 5 liters of water (twice) in this order. Then, methylene chloride was removed by distillation to obtain a polymer in the form of flakes having a viscosity-average molecular weight of 17,500.

(3) Production of Reactive PDMS 1,483 Grams of octamethylcyclotetrasiloxane, 96 g of 1,1,3,3-tetramethyldisiloxane and 35 g of 86% sulfuric acid were mixed and stirred for 17 hours at room temperature. Then, the oil phase was separated and 25 g of sodium hydrogen carbonate was added thereto. The mixture was stirred for 1 hour. After filtration, the oil phase was vacuum distilled at 150° C. under a pressure of $4 \times 10^2$ Pa (3 torr) to remove low boiling point components and to obtain an oily product.

To a mixture of 60 g of 2-allylphenol and 0.0014 g of platinum in the form of a platinum chloride-alcoholate complex, 294 g of the oily product obtained in (2) above were added a temperature of 90° C. The resulting mixture was stirred for 3 hours while maintaining the temperature in the range of 90 to 115° C. The reaction product was extracted with methylene chloride and the extract was washed 3 times with an 80% aqueous methanol to remove excess 2-allylphenol. The product was dried over anhydrous sodium sulfate and then the solvent was removed under vacuum by heating up to 115° C. The resultant PDMS terminated with phenol was found to have 30 repeating dimethylsilanoxy units by NMR measurement.

(4) Production of PC-PDMS Copolymer

182 Grams of reactive PDMS obtained in (3) above were dissolved in 2 liters of methylene chloride, to which 10 liters of PC oligomer obtained in (1) above were mixed. To the resulting mixture, a solution of 26 g sodium hydroxide dissolved in 1 liter of water and 5.7 milliliters of triethylamine were added, and the mixture was reacted for 1 hour with stirring at 500 rpm.

After completion of the reaction, a solution of 600 g of bisphenol A dissolved in 5 liters of a 5.2 mass % aqueous sodium hydroxide solution, 8 liters of methylene chloride and 96 g of p-tert-butylphenol were added to the above reaction system and the mixture was reacted for 2 hours with stirring at 500 rpm.

After completion of the reaction, 5 liters of methylene chloride were added to the reaction mixture. Thereafter, the mixture was washed successively with 5 liters of water, 5 liters of an alkali (0.03 N aqueous sodium hydroxide solution), 5 liters of an acid (0.2 N hydrochloric acid) and 5 liters of water (twice) in this order. Then, methylene chloride was removed to obtain PC-PDMS copolymer in the form of flakes. The thus obtained PC-PDMS copolymer was vacuum dried at 120° C. for 24 hours. The copolymer was found to have a viscosity-average molecular weight of 17,000 and a PDMS content of 4.0 mass %.

The viscosity-average molecular weight and PDMS content were determined as follows.

(1) Viscosity-average Molecular Weight (Mv)

The viscosity of a methylene chloride solution at 20° C. was measured using an Ubbelohde type viscometer. From the results of the measurement, a limiting viscosity [η] was determined. The Mv was calculated according to the following equation:

$$[\eta]=1.23\times10^{-5}Mv^{0.83}.$$

(2) PDMS Content

The content was determined on the basis of an intensity ratio of the peak at 1.7 ppm attributed to the methyl group of the isopropyl group of bisphenol A to the peak at 0.2 ppm attributed to the methyl group of the dimethylsiloxane in $^1$H-NMR.

Preparation Example 2

Production of Alkylphenoxy-Terminated Aromatic Polycarbonate Resin (1) Preparation of Alkylphenol (a)

In a reactor equipped with a baffle and a stirring blade, reaction raw materials and a catalyst were charge in such a proportion that the amount of phenol was 300 mass parts, the amount of 1-dococene was 110 mass parts (phenol/olefin molar ratio=9:1) and the amount of a highly acidic polystyrene-based sulfonic acid-type cationic resin (Amberlyst 15; manufactured by Rohm and Haas) as the catalyst was 11 mass parts. The mixture was reacted at 120° C. for 3 hours with stirring. After completion of the reaction, purification by vacuum distillation was performed to obtain alkylphenol (a). The alkyl group of alkylphenol (a) was found to have an average carbon number of 22 and to be branched.

(2) Production of Terminus-modified PC

In a vessel having an inside volume of 50 liters and equipped with a stirrer, 10 liters of a polycarbonate oligomer obtained in the same manner as described in (2) of Preparation Example 1 were placed, in which 209 g of alkylphenol (a) obtained in (1) above were dissolved. To the solution was then added an aqueous sodium hydroxide solution (sodium hydroxide: 53 g; water: 1 liter) and 5.8 milliliters of triethylamine, and the mixture was reacted for 1 hour with stirring at 300 rpm. Thereafter, an aqueous sodium hydroxide solution of bisphenol A (bisphenol: 720 g, NaOH: 412 g, water: 5.5 liters) and 8 liters of methylene chloride were added to the above system and the mixture was reacted for 1 hour with stirring at 500 rpm. After completion of the reaction, 7 liters of methylene chloride and 5 liters of water were added to the reaction mixture and stirred at 500 rpm for 10 minutes. Thereafter, the mixture was allowed to leave at rest and separated into an organic phase and an aqueous phase. The organic phase thus obtained was washed successively with 5 liters of an alkali (0.03 N NaOH), 5 liters of an acid (0.2 N hydrochloric acid) and 5 liters of water (twice) in this order. Then, methylene chloride was removed by distillation to obtain a polymer (PC-2) in the form of flakes. The fraction of the alkylphenoxy group terminus was found to be 99.0%. The polymer was found to have a viscosity-average molecular weight of 20,000.

Examples 1 to 4 and Comparative Examples 1 to 4

Components (A) through (D) were blended in the proportions shown in Table 1 (Components (A), (B), (C) and (D) are indicated in terms of mass %), fed to a vented double-screw extruder (Model: TEM35; manufactured by Toshiba Machine Co., Ltd.), melted and kneaded therein at 280° C., and then pelletized. In all Examples and Comparative Examples, 0.1 part by mass of a phosphorus-type antioxidant (PEP36) was added as a stabilizing agent.

The resulting pellets were dried at 120° C. for 10 hours and then molded by injection molding at a molding temperature of 280° C. (temperature of the molds: 80° C.) to obtain test pieces formed of the resins of Examples and Comparative Examples. Each of the test pieces was evaluated for respective properties according to the various evaluation tests described below.

The components used for blending and performance evaluation methods are as follows.

[Components Blended]

(A) Aromatic Polycarbonate-polyorganosiloxane Copolymer

PC-PDMS: The product prepared in Preparation Example 1 was used (viscosity-average molecular weight: 17,000; PDMS content: 4.0 mass %)

(B) Aromatic Polycarbonate Resin

PC-1: TOUGHLON FN1900A (Trade name; manufactured by Idemitsu Petrochemical Co., Ltd.; polycarbonate resin of a bisphenol A homopolymer; viscosity-average molecular weight: 19,500).

PC-2: The product obtained in Preparation Example 2 was used (viscosity-average molecular weight: 20,000).

(C) Fine Silica

Silica-1: AEROSIL 130 (Trade name; manufactured by Japan Aerosil Inc.; average particle diameter: 17 nm)

Silica-2: NYACOL DP5820 (Trade name; manufactured by Nyacol Nano Technologies, Inc.; ethylene glycol solution containing 30 mass % fine silica having average particle diameter of 20 nm)

Silica-3: FB48 (Trade name; manufactured by Denki Kagaku Kogyo Kabushiki Kaisha; fine particulate silica having an average particle diameter of 16 μm; used as comparative control)

(D) PTFE: CD076 (Trade Name; Manufactured by Asahi Glass Fluoropolymers Inc.)

[Performance Evaluation Method]

(1) IZOD (IZOD impact strength): in accordance with ASTM D256; 23° C. (thickness: ⅛ inch); unit: kJ/m$^2$.

(2) Melt Fluidity (melt index, MI): measured in accordance with JIS K7201 at a measuring temperature of 300° C. with a load of 1.2 kg.

(3) Appearance of product: square plate of 8×8 cm (thickness: 3 mm) was prepared and the sample was evaluated with naked eyes.

(4) Haze: in accordance with JIS K7105 (3 mm); evaluated using the samples of (3) above; high haze indicates poor dispersibility of resin.

(5) Flame Retardancy: UL94 standard; test sample thickness: 1.0 mm and 3.0 mm; vertical burning tests was carried according to Subject 94 of Underwriters Laboratories, Inc.

(6) Oxygen index: measured according to JIS K 7201; in a combustion tube containing oxygen/nitrogen with varying ratio, the sample was ignited by access from above; minimum oxygen/nitrogen ratio at which the combustion continues for at least 3 minutes was determined.

The evaluation results are summarized in Table 2.

TABLE 1

Composition of Blend

| Components Blended | Example 1 | Example 2 | Example 3 | Example 4 | Comparative Example 1 | Comparative Example 2 | Comparative Example 3 | Comparative Example 4 |
|---|---|---|---|---|---|---|---|---|
| (A) PC-PDMS | 99.5 | 99.5 | 25.0 | 50.0 | | 100 | 94.0 | 99.5 |
| (B) PC-1 | | | 74.2 | | 99.5 | | | |
| PC-2 | | | | 48.7 | | | | |
| (C) Silica-1 | 0.5 | | | | | | 6.0 | |
| Silica-2 | | 0.5 | 0.5 | 1.0 | 0.5 | | | |
| Silica-3 | | | | | | | | 0.5 |
| (D) PTFE | | | | 0.3 | | | | |

TABLE 2

Evaluation Results

| Items Evaluated | Example 1 | Example 2 | Example 3 | Example 4 | Comparative Example 1 | Comparative Example 2 | Comparative Example 3 | Comparative Example 4 |
|---|---|---|---|---|---|---|---|---|
| IZOD Impact Strength (Kj/m$^2$) | 75 | 75 | 80 | 65 | 25 | 75 | 15 | 10 |
| Fluidity MI | 20 | 22 | 20 | 30 | 20 | 20 | 18 | 17 |
| Appearance of Molded Article | good | good | good | good | good | good | grains are present | grains are present |
| Haze | 25 | 10 | 15 | — | 70 | 5 | 90 | 90 |
| Flame Retardancy 3 mm | V-0 | V-0 | V-0 | — | V-2 | V-2 | V-2 | V-2 |
| Flame Retardancy 1 mm | — | — | — | V-0 | — | — | — | — |
| Oxygen Index | 39 | 40 | 38 | 40 | 30 | 36 | 39 | 27 |

The results shown in Table 2 reveal the following points.

As will be appreciated by comparison between Examples 1 through 3 and Comparative Examples, the compositions in which fine silica is compounded with PC-PDMS only or with PC-PDMS have a higher impact strength, achieve a flame retardancy of a V-0 level and show an improved oxygen index as compared with the composition which is not compounded with fine silica or which does not contain PC-PDMS. Further, the dispersibility of silica is good and the increase of haze is small. In the method in which fine silica is added after having been dispersed in a solvent (composition using silica-2), the dispersibility of silica becomes better and the impact strength is further improved. As seen in Example 4, further addition of PTFE can further improve the flame retardancy and can achieve V-0 in a smaller thickness of 1.0 mm.

In contrast, when PC-PDMS is not used, the dispersibility of silica is not good, the haze increases, flame retardancy of V-0 is not obtainable and the oxygen index is low (Comparative Example 1). When PC-PDMS is used by itself, V-0 is not obtainable because of dripping (Comparative Example 2). Too large an amount of silica in excess of 5 mass % causes a reduction of the impact strength and bad appearance of the molding (Comparative Example 3). When the size of silica added is large (the average particle diameter of silica-3 is 16 μm), no improvement in flame retardancy is obtainable, the impact strength is lowered and the appearance of the molding is bad (Comparative Example 4).

INDUSTRIAL APPLICABILITY

The thermoplastic resin composition of the present invention can give molded articles which show excellent flame retardancy and impact strength, which are good in dimensional accuracy and which show good appearance and, therefore, it is expected that the composition will be applied to expanded fields, for example, housings and parts of electric and electronic appliances, such as OA appliances, information appliances and electric appliances for household use, and further, automobile parts.

What is claimed is:

1. A thermoplastic resin composition comprising:
(A) 0.5 to 99.9 mass % of an aromatic polycarbonate-polyorganosiloxane copolymer having a terminal group represented by formula (1):

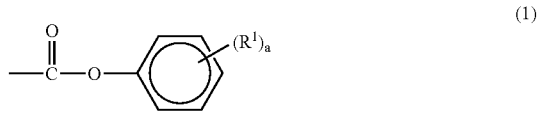

wherein $R^1$ represents an alkyl group having 1 to 35 carbon atoms and a is an integer of 0 to 5;

wherein the content of a polyorganosiloxane in the aromatic polycarbonate-polyorganosiloxane copolymer of component (A) from 0.1 to 4 mass % based on the whole thermoplastic resin composition including component (A);

(B) 0 to 99.5 mass % of an aromatic polycarbonate having a terminal group represented by formula (2):

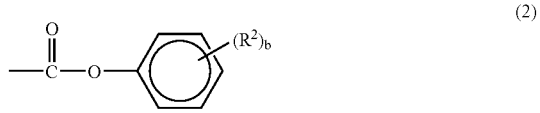

wherein $R^2$ represents an alkyl group having 1 to 35 carbon atoms and b is an integer of 0 to 5;

(C) 0.1 to 5 mass % of fine silica having an average particle diameter of 50 nm or less, wherein said fine silica is dispersed in a solvent; and (D) 0 to 2 mass % of a polytetrafluoroethylene.

2. The thermoplastic resin composition as claimed in claim 1, wherein said aromatic polycarbonate-polyorganosiloxane copolymer of component (A) has a polyorganosiloxane moiety having a polydimethylsiloxane skeleton.

3. A molded article comprising a thermoplastic resin composition as claimed in claim 1.

4. A thermoplastic resin produced by a process comprising:

compounding

A) 0.5 to 99.9 mass % of an aromatic polycarbonate-polyorganosiloxane copolymer having a terminal group represented by formula (1);

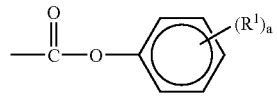

(1)

wherein $R^1$ represents an alkyl group having 1 to 35 carbon atoms and a is an integer of 0 to 5;

wherein the content of a polyorganosiloxane in the aromatic polycarbonate-polyorganosiloxane copolymer of component (A) is from 0.1 to 4 mass % based on the whole thermoplastic resin composition including component (A);

B) 0 to 99.5 mass % of an aromatic polycarbonate having a terminal group represented by formula (2);

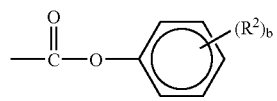

(2)

wherein $R^2$ represents an alkyl group having 1 to 35 carbon atoms and b is an integer of 0 to 5;

C) 0.1 to 5 mass % of a fine silica having an average particle diameter of 50 nm or less, wherein said fine silica is dispersed in a solvent; and D) 0 to 2 mass % of a polytetrafluoroethylene to obtain said thermoplastic resin composition.

5. A method of producing a thermoplastic resin composition, said method comprising:

compounding

A) 0.5 to 99.9 mass % of an aromatic polycarbonate-polyorganosiloxane copolymer having a terminal group represented by formula (1);

wherein the content of a polyorganosiloxane in the aromatic polycarbonate-polyorganosiloxane copolymer of component (A) is from 0.1 to 4 mass % based on the whole thermoplastic resin composition including component (A);

B) 0 to 99.5 mass % of an aromatic polycarbonate having a terminal group represented by formula (2);

C) 0.1 to 5 mass % of a fine silica having an average particle diameter of 50 nm or less, wherein said fine silica is dispersed in a solvent;

D) 0 to 2 mass % of a polytetrafluoroethylene to obtain said thermoplastic resin composition.

6. The thermoplastic resin composition as claimed in claim 1, wherein said fine silica has an average particle diameter of 5 to 40 nm.

7. The thermoplastic resin composition as claimed in claim 6, wherein said fine silica is present in an amount that ranges from 0.1 to 3 mass %.

8. The thermoplastic resin composition as claimed in claim 1, wherein said fine silica is present in an amount that ranges from 0.1 to 3 mass %.

9. The thermoplastic resin composition as claimed in claim 1, wherein said fine silica has an average particle diameter of 17 nm.

10. The thermoplastic resin composition as claimed in claim 1, wherein said fine silica has an average particle diameter of 20 nm.

11. The thermoplastic resin composition as claimed in claim 1, wherein said fine silica has an average particle diameter of 17 nm and is present in an amount of 0.5 mass %.

12. The thermoplastic resin composition as claimed in claim 1, wherein said fine silica has an average particle diameter of 20 nm and is present in an amount of 0.5 mass %.

13. The thermoplastic resin composition as claimed in claim 1, wherein said fine silica has an average particle diameter of 20 nm and is present in an amount of 1.0 mass %.

* * * * *